(12) United States Patent
Liu et al.

(10) Patent No.: US 10,681,428 B2
(45) Date of Patent: Jun. 9, 2020

(54) VIDEO VIEW ESTIMATION FOR SHOWS DELIVERED USING A VIDEO DELIVERY SERVICE

(71) Applicant: HULU, LLC, Santa Monica, CA (US)

(72) Inventors: Cailiang Liu, Beijing (CN); Zhibing Wang, Beijing (CN); Dong Guo, Beijing (CN)

(73) Assignee: HULU, LLC, Santa Monica, CA (US)

( * ) Notice: Subject to any disclaimer, the term of this patent is extended or adjusted under 35 U.S.C. 154(b) by 400 days.

(21) Appl. No.: 14/792,220

(22) Filed: Jul. 6, 2015

(65) Prior Publication Data

US 2016/0007093 A1 Jan. 7, 2016

Related U.S. Application Data

(60) Provisional application No. 62/021,596, filed on Jul. 7, 2014.

(51) Int. Cl.

| | |
|---|---|
| *H04N 21/81* | (2011.01) |
| *H04N 21/2668* | (2011.01) |
| *H04N 21/2547* | (2011.01) |
| *H04N 21/25* | (2011.01) |
| *H04N 21/8541* | (2011.01) |
| *G06Q 30/02* | (2012.01) |

(52) U.S. Cl.
CPC ........... *H04N 21/812* (2013.01); *G06Q 30/02* (2013.01); *H04N 21/251* (2013.01); *H04N 21/2547* (2013.01); *H04N 21/2668* (2013.01); *H04N 21/8541* (2013.01)

(58) Field of Classification Search
None
See application file for complete search history.

(56) References Cited

U.S. PATENT DOCUMENTS

| | | | |
|---|---|---|---|
| 8,510,770 B1* | 8/2013 | Oztaskent | H04L 67/22 705/319 |
| 2007/0154163 A1* | 7/2007 | Cordray | H04N 21/6187 386/278 |
| 2010/0287592 A1* | 11/2010 | Patten | H04N 5/44591 725/59 |
| 2011/0072452 A1* | 3/2011 | Shimy | H04N 7/163 725/25 |

(Continued)

*Primary Examiner* — Nathan J Flynn
*Assistant Examiner* — Christen A Kurien
(74) *Attorney, Agent, or Firm* — Fountainhead Law Group, PC

(57) ABSTRACT

In one embodiment, a method includes sending videos to users that use a video delivery service. The videos include shows that have episodes released sequentially. The method records historical records of video views for the video based on the sending of the videos to the users. For a show, a show-specific model is determined to predict future video views by performing: determining historical records of video views for different episodes of the show; training the show-specific model with the historical records, wherein the show-specific model models a decay curve with a regularizing term to regularize a decay speed; using the show-specific model to predict future video views for a future time range for episodes of the show; and outputting the future video views to an ad system configured to sell ads for the show.

20 Claims, 10 Drawing Sheets

(56) References Cited

U.S. PATENT DOCUMENTS

| | | | | |
|---|---|---|---|---|
| 2011/0307913 A1* | 12/2011 | Wang | ................... | G06Q 10/063 |
| | | | | 725/9 |
| 2013/0246323 A1* | 9/2013 | Athas | ...................... | G06N 5/02 |
| | | | | 706/46 |
| 2014/0259037 A1* | 9/2014 | Belyaev | ........... | H04N 21/44008 |
| | | | | 725/14 |

* cited by examiner

VIDEO VIEW ESTIMATION FOR SHOWS DELIVERED USING A VIDEO DELIVERY SERVICE

CROSS REFERENCE TO RELATED APPLICATIONS

The present disclosure claims priority to U.S. Provisional App. No. 62/021,596, entitled "Video Views Estimation in Inventory Projection", filed Jul. 7, 2014, the contents of which is incorporated herein by reference in its entirety.

BACKGROUND

A video delivery service may provide videos of media programs that include advertising breaks inserted within the videos being delivered to client devices. The video delivery service may offer a great variety of media programs, such as newly-released episodes of serial shows, movies, and other types of media programs. Advertisers would like to have their advertisements (ads) shown to target audiences, such as young adult users. An ad targeting service may be used to determine when to insert a targeted ad for an advertiser based on characteristics determined for the users.

Future video views estimation is a critical part of an ad targeting service. To fulfill an advertiser's requirements, such as displaying a certain kind of advertisements when it is determined the target audience, such as young adult users, are watching the video, the ad targeting service has to estimate the number of ad impressions for the future. Third party agencies may monitor and measure the number of advertisements shown to users every day. This estimate is then used to sell a number of future ad slots to advertisements. During operation, if the actual number of views of the advertiser's ad does not match the advertisers' requirements on time or numbers, advertisers may reduce future contracts with the video delivery service in the future. To maximize the income for the video delivery service, the video delivery service has to predict the number of future video views precisely and sign as many contracts as possible.

SUMMARY

In one embodiment, a method includes sending videos to users that use a video delivery service. The videos include shows that have episodes released sequentially. The method records historical records of video views for the video based on the sending of the videos to the users. For a show, a show-specific model is determined to predict future video views by performing: determining historical records of video views for different episodes of the show; training the show-specific model with the historical records, wherein the show-specific model models a decay curve with a regularizing term to regularize a decay speed; using the show-specific model to predict future video views for a future time range for episodes of the show; and outputting the future video views to an ad system configured to sell ads for the show.

In one embodiment, a non-transitory computer-readable storage medium contains instructions, that when executed, control a computer system to be configured for: sending videos to users that use a video delivery service, wherein the videos include shows that have episodes released sequentially; recording historical records 108 of video views for the video based on the sending of the videos to the users; for a show, determining a show-specific model to predict future video views by performing: determining historical records of video views for different episodes of the show; training the show-specific model with the historical records, wherein the show-specific model models a decay curve with a regularizing term to regularize a decay speed; using the show-specific model to predict future video views for a future time range for episodes of the show; and outputting the future video views to an ad system configured to sell ads for the show.

In one embodiment, an apparatus comprising: one or more computer processors; and a non-transitory computer-readable storage medium comprising instructions, that when executed, control the one or more computer processors to be configured for: sending videos to users that use a video delivery service, wherein the videos include shows that have episodes released sequentially; recording historical records of video views for the video based on the sending of the videos to the users; for a show, determining a show-specific model to predict future video views by performing: determining historical records of video views for different episodes of the show; training the show-specific model with the historical records 108, wherein the show-specific model models a decay curve with a regularizing term to regularize a decay speed; using the show-specific model to predict future video views for a future time range for episodes of the show; and outputting the future video views to an ad system configured to sell ads for the show.

The following detailed description and accompanying drawings provide a better understanding of the nature and advantages of particular embodiments.

DETAILED DESCRIPTION

Described herein are techniques for a video view estimation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

A video delivery service may provide a library of videos of media programs to users that subscribe to the video delivery service. The videos may include shows that have episodes released serially. For example, some shows may have episodes released daily, weekly, etc. These shows are also released seasonally, such as the shows may go on a hiatus during the summertime when no episodes are released. The video delivery service may not broadcast the videos via a set schedule, but rather may be a streaming service that allows users to request the videos on demand whenever they are released. All videos in the library may be requested on demand. Due to the on demand nature and the release of episodes serially, the video view estimation for shows may be difficult. Particular embodiments use an improved video view estimation method to predict the video views for these types of shows.

For a show, particular embodiments may determine a show-specific model to predict future video views. In this case, instead of having one decay curve for all shows, particular embodiments may determine a show-specific model just for that show. This may predict the future video views better than using a single decay curve for all shows.

To determine the show-specific model, the system determines historical records of video views for the show. Then, a show-specific model is trained with the historical records for that show. The show-specific model models a decay curve with a regularizing term to regularize a decay speed. The regularizing term is used to compensate for the characteristics of the show's views on the video delivery service. The system then uses the show-specific model to predict future video views for a future time range for the show. The future video views are then output to an ad targeting system configured to sell ads for the show.

System Overview

Figure 1:
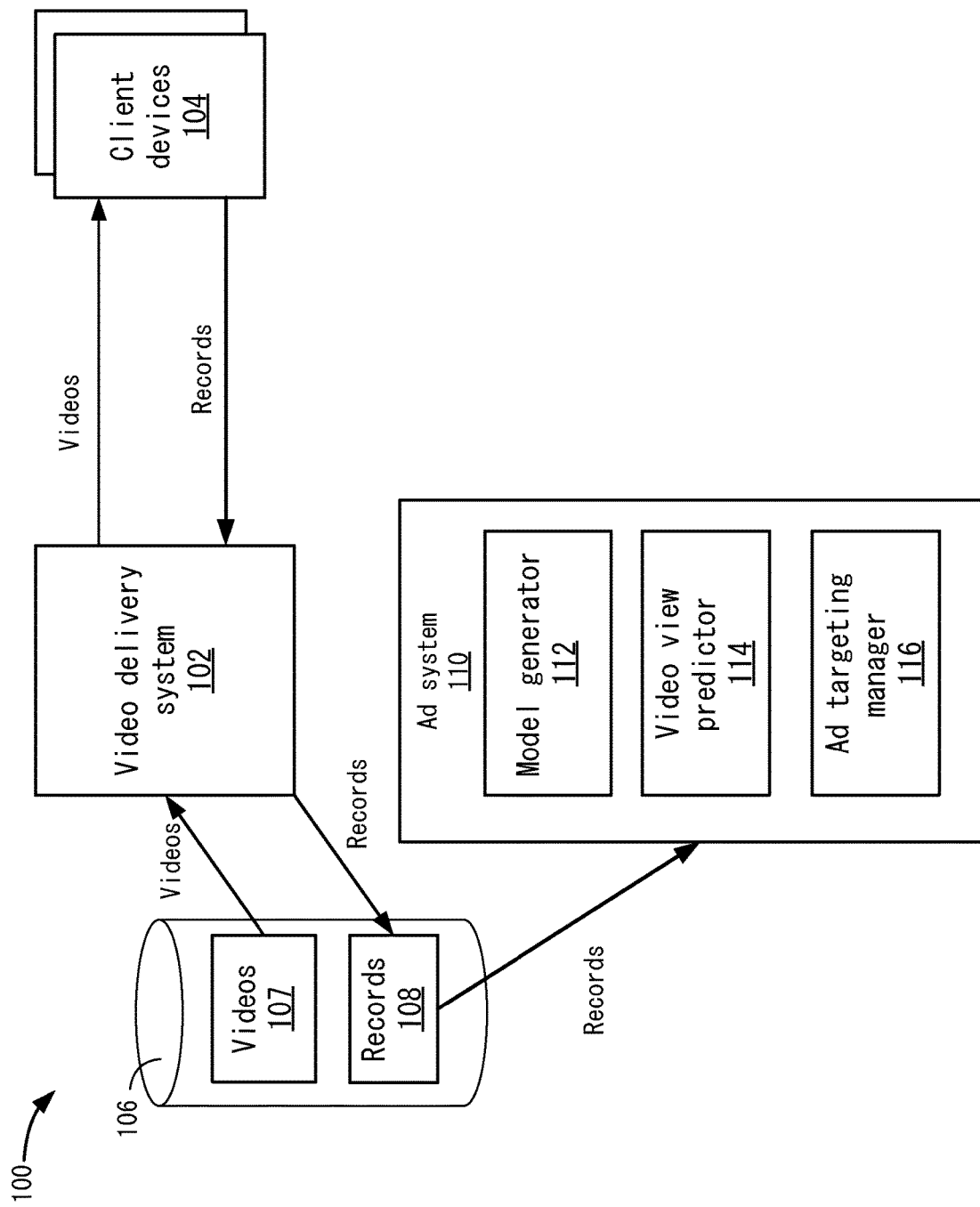
FIG. 1 depicts a simplified system for estimating video views according to one embodiment.

FIG. 1 depicts a simplified system 100 for estimating video views according to one embodiment. A video delivery system 102 delivers videos to client devices 104 from storage 106. Although not shown, a content delivery network (CDN) may be used to deliver the videos to client devices 104. The content delivery network may be a third-party network that is separate from the video delivery service. However, video delivery system 102 may contract with the CDNs to have the videos 107 delivered to client devices 104.

Users may subscribe to the video delivery service. The video delivery service may provide videos on an ad-supported basis. That is, the video delivery service may insert advertisements in ad breaks while the user is watching the video. The video delivery service may then charge the advertisers when users view the advertisements, which may be inserted dynamically when the videos are viewed by users. In one example, the advertisements are determined in real-time based on characteristics of the user watching the video. Further, in one embodiment, the user cannot fast forward or skip the inserted advertisements. The video delivery service may release episodes on a periodic or serial basis, and when released, may be requested on demand. These releases result in spikes in demand and this may affect the video view estimation.

The videos that may be sent may include different types of media programs. For example, shows and movies are sent. Shows have episodes released serially, such as daily, weekly, etc., and also go on hiatus for a time period, such as the summertime, when no episodes are released. Movies are released once, but there may be a number of sequels, but the sequels are not released on a set pattern like the episodes of the shows. The shows may be long-form and short-form. The long-form videos may be full episodes and short-form videos may be shortened versions of long-form videos, such as clips. Other types of videos may include half episodes, clips, free taste, mini, and baby video types. Short form videos may generally include half episodes, clips, free taste, mini, and baby types.

Video delivery system 102 may determine historical records 108 for the video views of the videos. For example, the historical records 108 may indicate how many users and which users viewed the video, and at what time. Other information for the video views may also be stored in historical records 108 in storage 106.

An ad system 110 may include multiple computing devices, such as servers, that can predict video views for videos. Then, once the video views are predicted, ad slots can be sold to advertisers based on the predicted number of video views. In one example, ad system 110 includes a model generator 112, a video view predictor 114, and an ad targeting manager 116.

Model generator 112 may determine the model to use with each video. For example, the video delivery service may include different types of videos, such as long-form videos or short-form videos. Model generator 112 may maintain different models for the different types of videos. However, most of the video views occur from long-form videos, which have a more regular pattern than short-form videos. The short-form videos may include all video types except for full episode and movie video types.

Model generator 112 may classify the videos or the shows into ad models. For a specific show and ad model, the view curves may start with the same curve model, but start from different dates that correspond with episode releases. That is, the curve model may start to decay from an episode release time. For long-form videos, model generator 112 uses a regularized log linear model to model existing long-form shows (e.g., episodes that have already been released). The peak number of video views and video episode release dates highly correlate for shows, such as very popular shows. Model generator 112 uses a seasonal model for future release videos (e.g., episodes that have not been released). The seasonal model predicts when episodes will be released and uses a regularized log linear model to predict video views for the future release of the long-form shows. Model generator 112 also uses a linear model to predict short-form videos. The regularized log linear model is used for long-form videos because, for a show that releases episodes periodically, a standard decay curve may not correctly predict video views accurately due to the large spikes in viewership as will be discussed in more detail below. However, the regularized log linear model may be able to better predict the video views. The linear model for short-form videos is used because the short-form views are irregular and roughly proportional to corresponding long-form video views in the same show.

To predict long-form video views, model generator 112 builds a model that may include two parts: a first part models decaying video view curves, and a second part models release dates and first-day views for videos released in future. Based on the predicted long-form video views, model generator 112 builds linear models to predict short-form video views. The building of the models will be described in more detail below.

Video view predictor 114 may predict the video views using the generated models. Video view predictor 114 may input information into the generated model to determine future video views for existing episodes of shows. For example, video view predictor 114 inputs the time range in which video views should be predicted into the model for the show. The output of the model may be video view predictions for all episodes of the shows.

The shows may be of different types, episodes that are released already and episodes that will be released. The episodes of shows that have already been released can still be viewed by users, and future video views are predicted. For the future releases, video view predictor 114 uses a seasonal release model and weekday release model to predict when episodes of the show will be released, and then can use the regularized log linear model to predict the video views for the future releases.

Video view predictor 114 outputs the video views to ad targeting manager 116. Ad targeting manager 116 may interact with advertisers to sell advertisement slots for advertisements. Ad targeting manager 116 may attempt to match the estimated video views with the advertisements sold. Having an accurate estimate of video views is important when selling advertisements.

Show Classification

Figure 2:
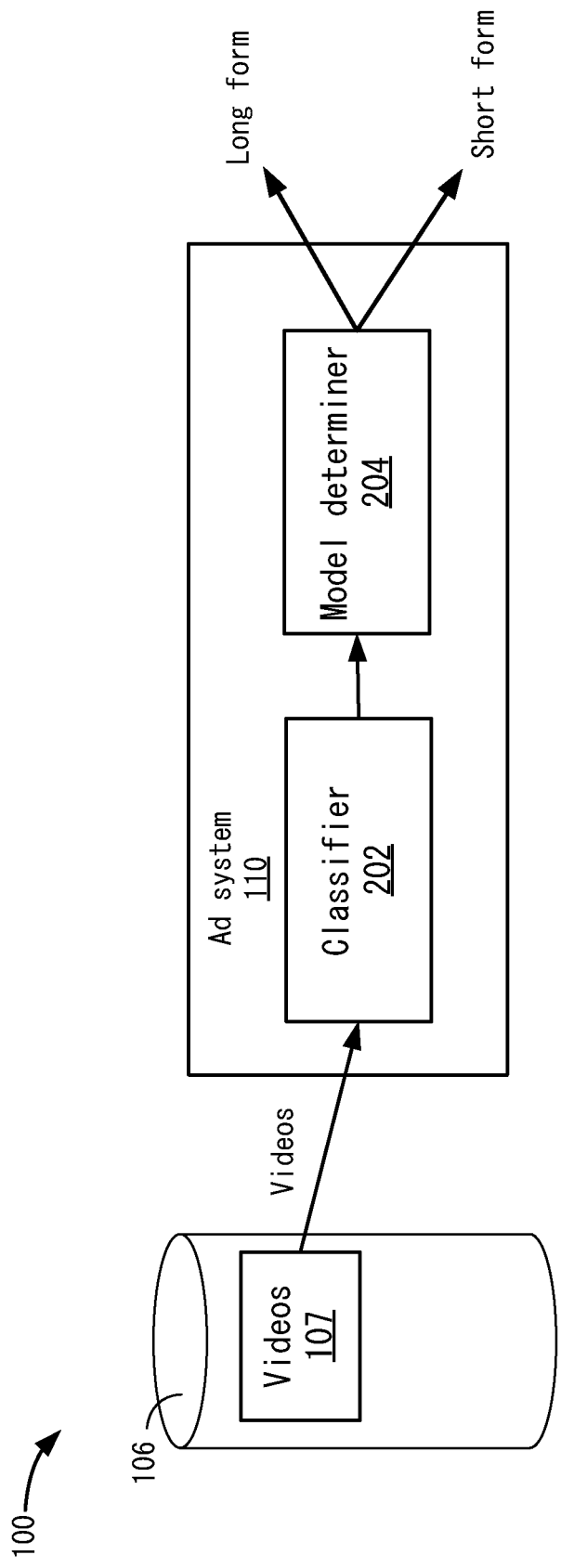
FIG. 2 depicts a system for classifying the videos according to one embodiment.

Before predicting the video views, ad system 110 needs to classify the videos. FIG. 2 depicts a system for classifying the videos according to one embodiment. A classifier 202 receives videos from storage 106. Classifier 202 may then analyze the videos to classify them into different ad models. For example, the ad models may include full episode, movie, half episode, clips, free taste, mini, baby, and other classifications. For discussion purposes, long-form videos and short-form videos will be discussed. Long-form videos may include full episode and movies, and short-form videos may include the other classifications.

Classifier 202 may classify the videos by analyzing video characteristics. For example, the time of the videos may be analyzed to determine if the videos are half episodes or full episodes. Further, metadata may indicate whether the videos are half episodes or full episodes. Also, a user may input whether or not the videos are half episodes or full episodes.

A model determiner 204 receives the classification and determines which model to use. In one example, model determiner 204 indicates whether the video should be classified as a long-form video or a short-form video.

Model Generation

Figure 3:
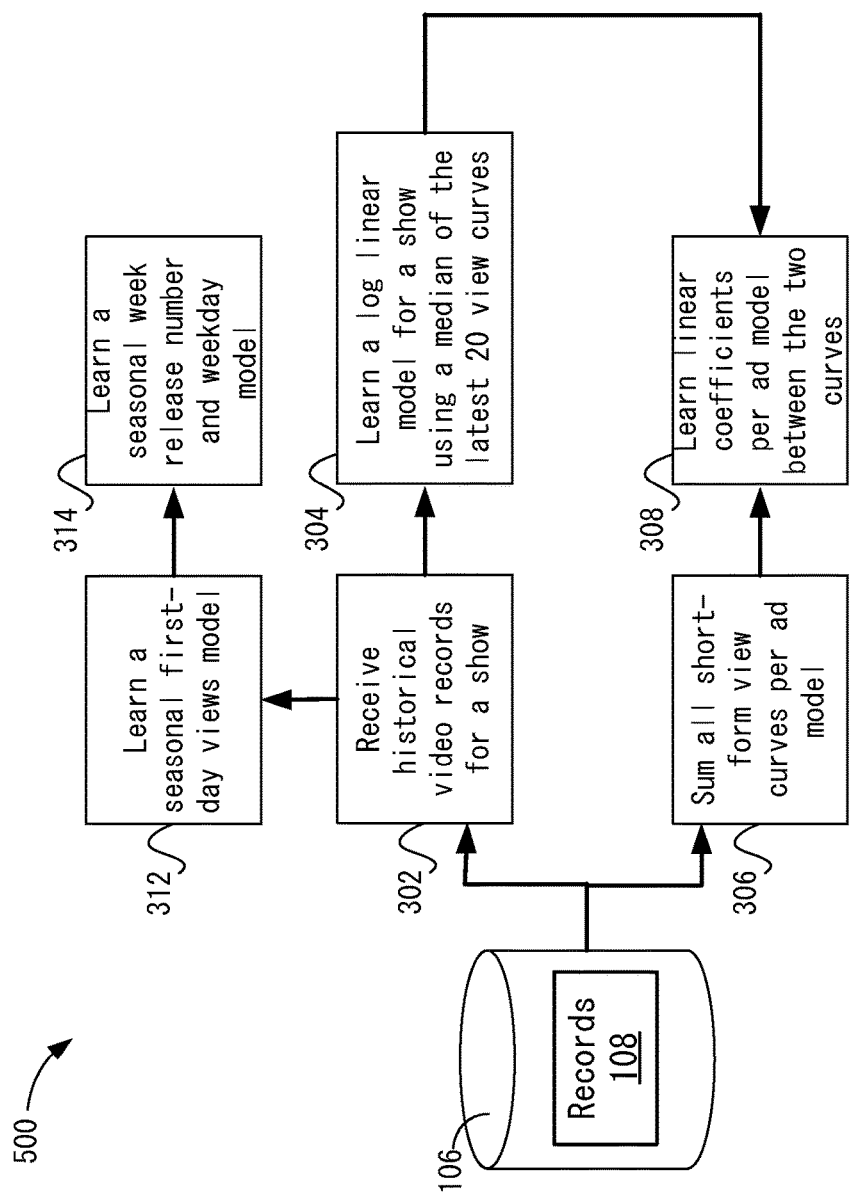
FIG. 3 depicts the model generation process according to one embodiment.

Once the classification is performed, ad system 110 can generate the models. FIG. 3 depicts the model generation process according to one embodiment. At 302, model generator 112 receives historical video records for a show. For the long-form video, model generator 112 learns a regularized linear model, such as a regularized log linear model for every episode of the show. The log model is used because the scale of video views of an episode for different dates varies a lot. The historical records 108 are used to train the regularized log linear model. When using a decay curve, the decay curve may follow a decay curve pattern, such as y=a/x+b, where x is the number of days after an episode is released by the video delivery service, y is the view count for that day, a is a constant, and a/x is near zero when x goes to infinity, and b is a constant that indicates the video views is b at the infinite future. However, this decay curve may not work for videos released by the video delivery service. For example, when popular videos are released, the views spike to a very high level. The model does not fit the decay curve correctly because b could be negative or a very high positive number, which is not consistent with statistics when x becomes large. This may be especially true for curves that have insufficient data points from historical records 108 and over-fitting may occur. For example, the following may occur:

When b<0 or b>>0, for sufficiently large day, there may be y<0 or y>>0. However, this may not realistic. A constraint that b is near 0 can be add to resolve the issue. However, the model may not fit the view curve very well with the constraint.

The decreasing speeds are also different for different curves. So the system needs a parameter to model the decaying speed, e.g. y=a/x^p, y=1/(ax+b). The latter one is hard to solve since it is not convex.

Accordingly, at 304, model generator 112 uses a regularized log linear model to resolve the above two issues. In one embodiment, the regularized log linear model may be equivalent to:

$$lny = w_a lnx + w_b,$$

which is equivalent to:

$$y = e^{w_b} x^{w_a}.$$

In the above, the variable $w_a$ models the decreasing speed of the decay curve and $e^{w_b}$ models the view quantity of the first day the episode is released in the video delivery service. x is the number of days after video is released and y is the video views. Model generator 112 may input the historical video records for the show into the log linear model. However, there may be not enough data points or large noise in the historical records 108 that model generator 112 may not be able to learn a reasonable value for the variables $w_a$ and $w_b$. For example, fitting the curve may lead to a too small value for variable $w_a$ that video views decrease to near zero very fast or a value of $w_a>0$ such that video views grow too fast. This may occur due to the release of episodes serially where video views may spike and then decay rapidly.

To account for the above, model generator 112 may introduce prior information that the variable $w_a$ is less than zero ($w_a<0$) and that the distribution of $w_a$ is near the value of a fixed number, such as −1. In this case, model generator 112 adds a regularizing term, which assumes the variable $w_a$ follows a normal distribution near −1. For example, the distribution may be:

$$P(w_a) \sim N(-1, \sigma).$$

The σ symbol may be the variance. The above indicates a normal distribution around −1 by a variance σ. This means the log-linear curve family roughly corresponds to the model. And the decaying speed varies within a constrained range, which corresponds to σ, for different series.

Synthesizing the likelihood term P(X|w), which is the probability of historical video views X={(x_i,y_i)} given parameters w, and the regularizing term, the final formulation to fit the decay curve is:

$$w = \operatorname{argmin}_w \ln P(X \mid w) + \ln P(w) =$$

$$\operatorname{argmin}_w \sum_i (w_a \ln x_i + w_b - \ln y_i)^2 + \frac{(w_a - \mu)^2}{\sigma^2}.$$

In the above, μ is the mean of prior distribution of $w_a$. Minimizing the synthesized formulation gives an optimal w for a show, which models the specific decay curve for all episodes of the show.

The log my is used instead of y because ad system 110 is predicting future video views that are commonly much lower than the first available days of an episode release. That is, the views spike during the first available days of an episode and decay rapidly. Moreover, the log lily is more accurate on low numbers and is not sensitive to large fluctuations during the first days. For video curves that have multiple view spikes, model generator 112 fits the model using a smaller number of data points, such as the last 60 data points of historical records 108 for predicting fixture video views. By using a smaller number of data points, the model filters out noise data points in earlier dates, which may be not as relevant to future video views.

The above formulation for the variable w combines the likelihood and prior information. This yields the optimal values for the variables $w_a$ and $w_b$. In this case, the optimal decay speed for the entire show may be known.

The solution for the above model may be determined using a least squared optimization problem. Model generator 112 can find the optimal solution via the least squared method as follows:

$$w = \mathrm{argmin}_w P(X \mid w) P(w)$$
$$= \mathrm{argmin}_w \ln P(X \mid w) + \ln P(w)$$
$$= \mathrm{argmin}_w \sum_i \|w_a \ln x_i + w_b - \ln y_i\|^2 + \ln \exp \frac{(w_a - \mu)^2}{\sigma^2} + C$$
$$= \mathrm{argmin}_w \sum_i (w_a \ln x_i + w_b - \ln y_i)^2 + \frac{(w_a - \mu)^2}{\sigma^2}$$
$$= \mathrm{argmin}_w f(w)$$

$$\frac{\partial f(w)}{\partial w_a} = \sum_i 2 \ln x_i (w_a \ln x_i + w_b - \ln y_i) + 2 \frac{w_a - \mu}{\sigma^2} = 0$$

$$\frac{\partial f(w)}{\partial w_a} = \sum_i 2 (w_a \ln x_i + w_b - \ln y_i) = 0$$

$$\begin{bmatrix} \sum_i \ln^2 x_i + \frac{1}{\sigma^2} & \sum_i \ln x_i \\ \sum_i \ln x_i & N \end{bmatrix} w = \begin{bmatrix} \sum_i \ln x_i \ln y_i + \frac{\mu}{\sigma^2} \\ \sum_i \ln y_i \end{bmatrix}$$

The above formulation may be used to determine the variables $w_a$ and $w_b$ for the decay curve, which may determine the decay factor.

Referring back to FIG. 3, at 304, rather than using all video curves in a show, model generator 112 learns a regularized log linear model for a show using a median of the latest 20 view curves for the episodes of the show, which are less noisy and closer to future video views. For the learned linear model for a show for the last 20 view curves, to estimate video view scales for future videos, the system analyzes the video views from a number of shows, such as the top 20 shows. The Pearson correlation coefficient (around 0.62) indicates that these curves correlate with the number of new episodes released per week. The system also examines the Pearson correlation coefficient between every video curve and the curves for all episodes. However, most of the coefficients are below 0.20, which can be considered as non-related. One of the last seasonal factors would be the video views of the first day (the views spike) of each video. The system also computes the Pearson correlation coefficient between the first-day video views and the year total views. The coefficient is around 0.62, which indicates correlation. For a year curve of first-day views for videos of top 20 shows, the correlation coefficient with total video views is around 0.62, which shows the first-day view curve by year, the seasonal change of the curve is similar to the year curve of total video views. The system may utilize the historical bimonthly median of first-day views for predicting first-day video views of future videos, which is equivalent to predicting $w_b$. At the end, model generator 112 sums all long-form video view curves per ad model to give a series level video view count for episodes of a show.

Also, to learn the relation between long-form and short-form videos, at 306, model generator 112 sums all short-form video view curves per ad model.

Then, at 308, model generator 112 learns linear coefficients between short-form and long-form video views, which are used to predict short-form video views after predicting long-form video views. Combining the long-form and the short-form video view curves may compensate for a small number of video views for short-form videos. However, it will be understood that the regularized log linear model for the long-form video may be used to predict the short-form video views. The regularizing of the log linear model may compensate for the small number of views for short-form videos.

In order to predict future video views, model generator 112 needs to learn when episodes are going to be released. Model generator 112 may make this determination automatically based on historical records 108. At 312, model generator 112 learns a seasonal first-day views model. Besides view scales which are modeled by the variable $w_b$ in the log-linear model, video views are also affected by user growth and seasonal factors. The seasonal first-day views model may be used to estimate the first-day views for these factors. The log-linear model assumes the view scale (modeled by the variable $w_b$) of all episodes in a show are same. But the views are also affected by user growth and seasons. The first-day view model provides these factors by modeling each episode's views for different seasons. For example, views may be lower in the summer months and higher in the winter months. Then, at 314, model generator 112 learns a seasonal week release number and weekday model. In this case, the model predicts when seasonal shows may be released and also on what weekday. This may model when shows may go on hiatus and episodes are not released.

Future video release dates are important for video views estimation and the model must take into account the effect of future release dates. Generally, the weekdays of episode release dates are common for the same show. For example, the same television show may release an episode on the same weekday. There may be some small differences in the real release dates, such as some weeks may have two or more episodes released on different weekdays, however, model generator 112 may be able to infer the most common weekday pattern via statistics of historical records 108. In one embodiment, a curve of newly-released video numbers per week in a year shows that there are weeks (commonly during summer hiatus) that few episodes or no episodes are released. A period when no episodes are released over a threshold, such as two or more weeks, may be referred to as a hiatus. To predict future video release dates, model generator 112 estimates the hiatuses and weekday releases.

To estimate weekday patterns, model generator 112 may count a number of previous weeks, such as the last 10-20 weeks in which episodes for a show have been released. The pattern for each week is denoted as a bit vector. If a specific pattern dominates (e.g., over 60% of all patterns), model generator 112 uses this pattern for future predictions of weekday releases. If no pattern covers a 60% of all patterns, model generator 112 uses the intersection of the two most frequent patterns as the final weekday pattern.

Model generator 112 also can predict the hiatus for a show. Commonly, most episodes of a show are released during a fixed period, such as from September to June of the next year. For example, episodes may not take place during the summertime of a year. Thus, few episodes are released during this time. To estimate future hiatuses, model generator 112 may decompose a year into subsections, such as 52 weeks. Using the historical records 108, if the number of episodes in a week is 0, the week is considered a hiatus week. Model generator 112 counts the average number of episodes released in each corresponding week of a last number of years, such as 3 years. The number for each week is used as a hiatus indicator, such as fewer than 0.5 episodes in a week indicates a hiatus week. A hiatus is then determined when a sequence of weeks includes a hiatus indicator. Also, hiatuses may be input manually by a user or metadata may be reviewed, such as electronic program guide information that indicates that episodes are reruns, and not new releases.

The hiatus and weekday estimation may then be used to learn the seasonal first day of use model which can estimate which weekday and in which weeks episodes are released.

Video View Prediction

Figure 4:
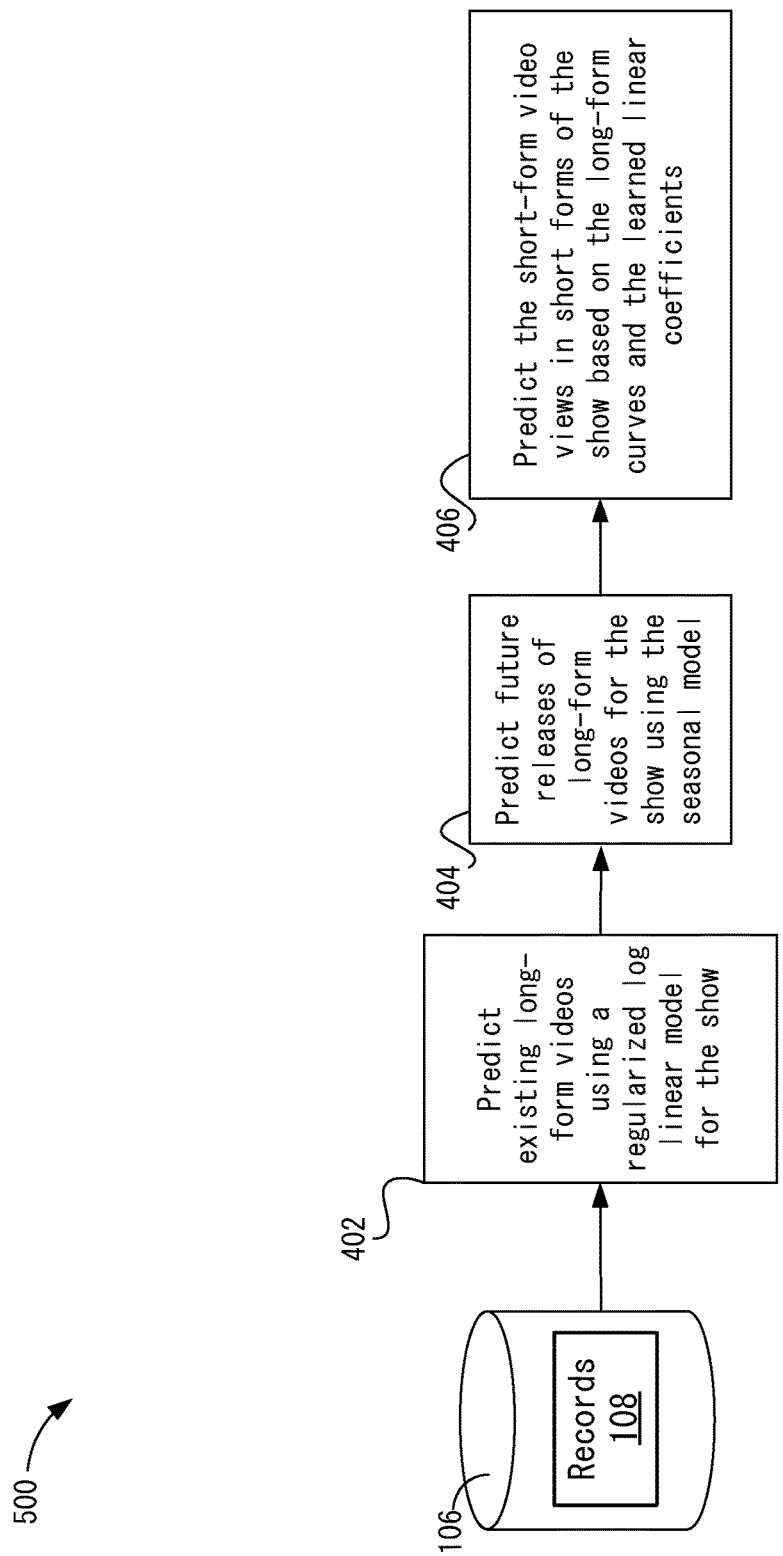
FIG. 4 depicts a method for predicting future video views according to one embodiment.

Once the ad models are generated, video view predictor 114 may predict the video views for already-released episodes of videos or future videos that have not been released. FIG. 4 depicts a method for predicting future video views according to one embodiment. At 402, video view predictor 114 predicts existing long-form videos using a regularized log linear model for the show. The regularized log linear model may have been the model generated above. The regularized log linear model aligns all first days of all video view curves to x=0 and provides a curve model per show using a median curve of the latest 20 shows. The video views estimation is based on episodes that have already been released. Typically, these episodes do not incur spikes in video views except for outlier events, such as promotions.

At 404, video view predictor 114 predicts future releases of long-form videos for the show using seasonal models and week and weekday release models. The seasonal model may adjust for video views in different episodes or seasons based on factors, such as user growth or popularity, for the video and the seasonal week release number and weekday model predicts the weeks and weekday of the release of the videos. The seasonal week release number and weekday model may take into account the weekday on which the episodes are released and also the hiatus of the show in predicting the video views. The weekday estimation and hiatus estimation are needed to determine the release of the episodes, which may result in a large spike in video views. This large spike in video views needs to be modeled by the regularized log linear model. The regularized log linear model for the show can then start the decay on the release dates. Due to the large number of video views that may be modeled on the release date, the regularized log linear model may be able to fit the curve to these values more accurately.

At 406, model generator 112 predicts the short-form video views in short forms of the show based on the long-form curves and the learned linear coefficients using: $V_{SF}=a*V_{LF}+b$, where $V_{SF}$ is the video views for the short-form video and $V_{LF}$ is the video views for the long-form videos.

Adding of Slow Growing Term

Figure 5:
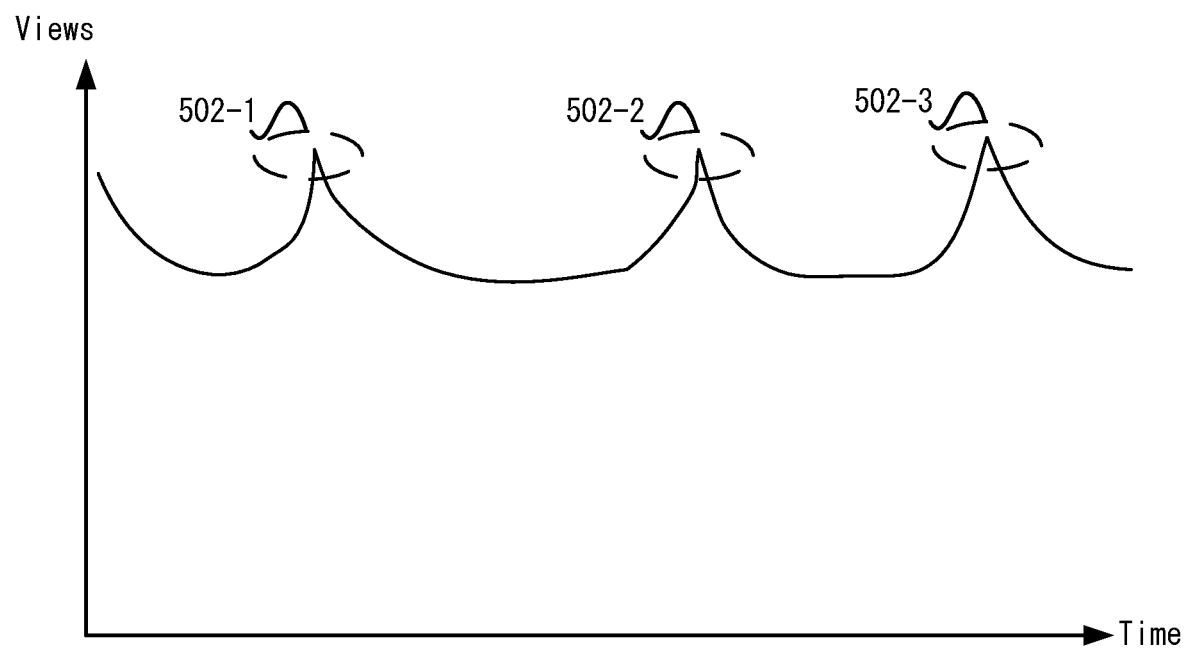
FIG. 5 depicts a graph of a video views curve for historical data according to one embodiment.

FIG. 5 depicts a graph 500 of a video views curve for historical data according to one embodiment. The view curve may show peaks in video views at 502-1, 502-2, and 502-3. These may be when episodes are released for the show and views increase rapidly. From there, the views may decay rapidly. However, using a regular decay curve may not be able to model these episodic releases accurately. Using the regularized log linear decay curve may allow video view predictor 114 to predict video views more accurately. That is, when an episode is released, the model does not suffer for the term b being too small or too big which may make the decay too small or too big.

Figure 6:
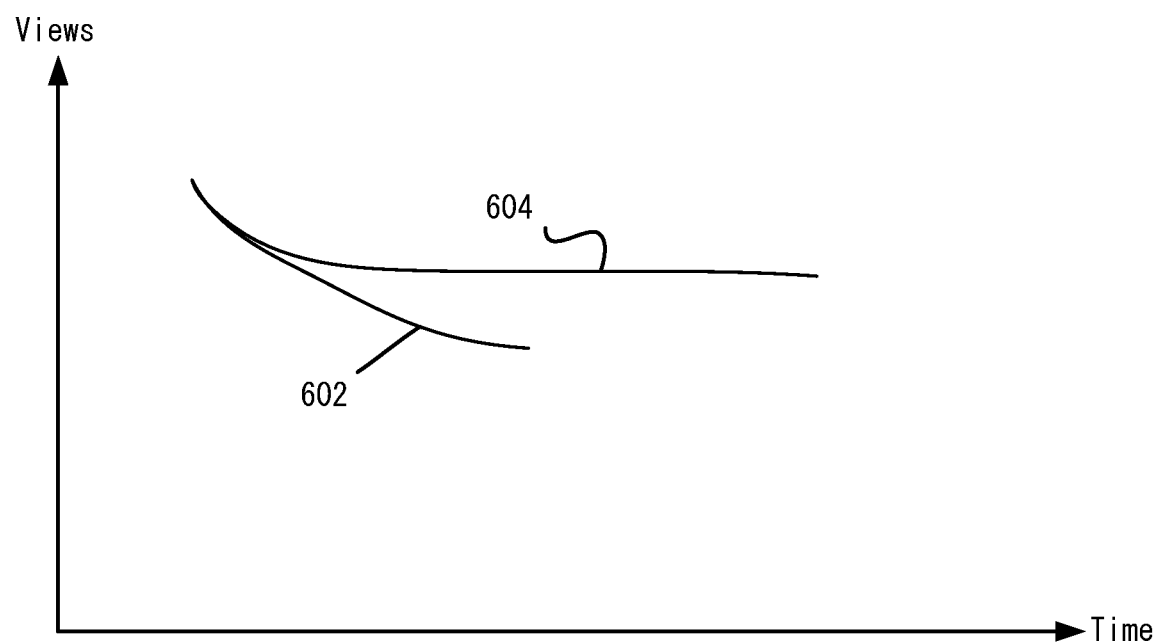
FIG. 6 shows the use of adding a slow-growing term to the model according to one embodiment.

FIG. 6 shows the use of adding a slow-growing term to the model according to one embodiment. At 602, the decay curve may follow a decay form rather than a linear form. As can be seen, the views may not decay in a linear manner as shown at 604. Thus, using the decay form for the model may not accurately model the views. To rectify this error, model generator 112 may add a slow-growing term to the model, such as to the term lnx. The following may add the slow-growing term:

$$lny=w_a(lnx+1)^{0.5})+w_b$$

The slow-growing term above may be $(lnx+1)^{0.5}$. This may add a slow-growing term that may move the decay curve at 602 to be more accurate to the linear decay as shown at 604.

Figure 7:
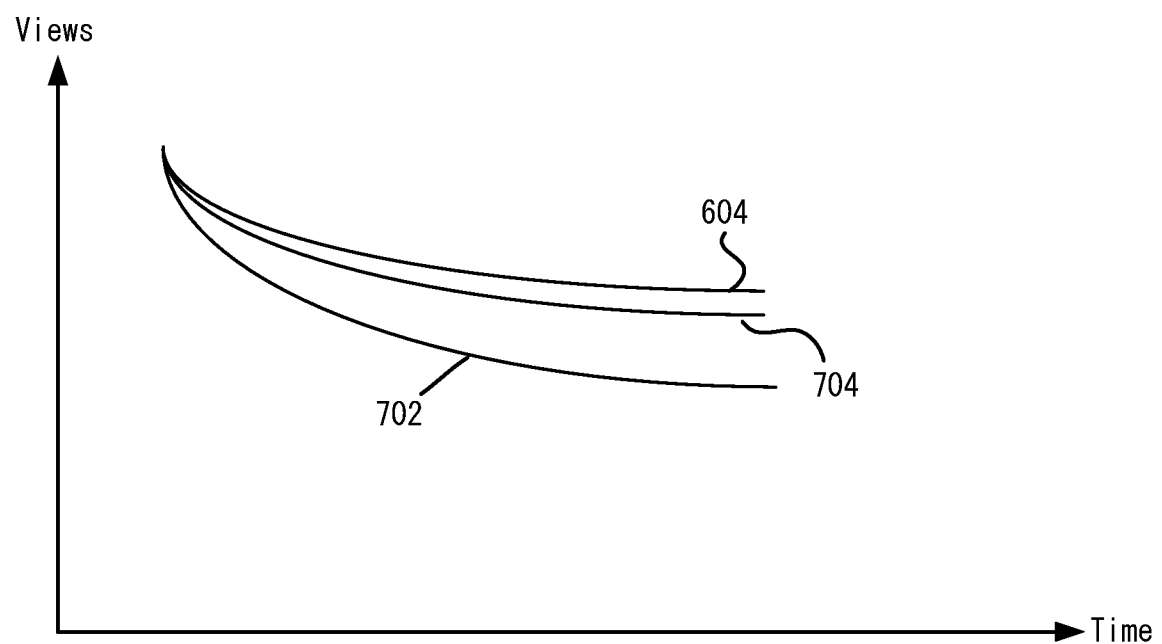
FIG. 7 depicts an example of using a standard decay curve and a regularized log video curve according to one embodiment.

FIG. 7 depicts an example of using a standard decay curve and a regularized log video curve according to one embodiment. At 702, a standard decay curve is shown that decays to zero very fast. This is because the decay curve has trouble modeling the spike in views that are experienced when an episode is released. However, at 704, the regularized log linear curve better fits the decay of the video views when an episode is released as shown at 706.

Outliers

Figure 8:
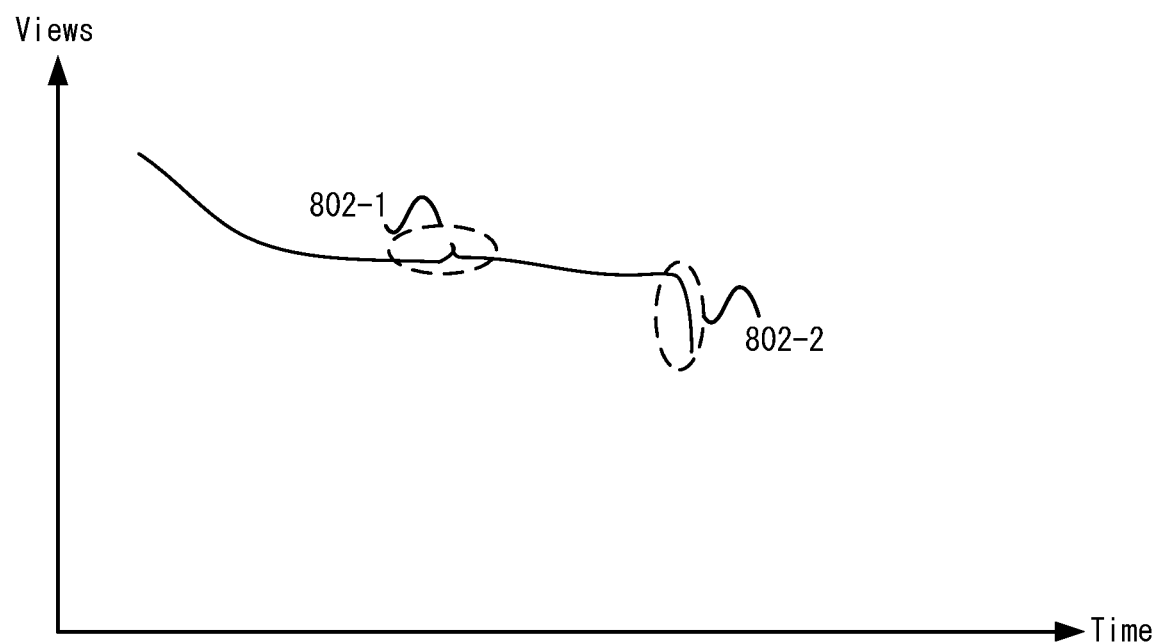
FIG. 8 depicts an example of a graph that shows outliers according to one embodiment.

Outliers may occur that need to be taken into account. FIG. 8 depicts an example of a graph 800 that shows outliers according to one embodiment. Outlier points are shown at 802-1 and 802-2. Outlier 802-1 may be when a special promotion occurred and video views increased because of the promotion. Also, outlier point 802-2 may be when video delivery service turned off the episode and the episode was not available anymore after that day. The model must take into account these outlier data points. Other reasons that may cause outlier data points may be system debugging, etc. To remove the outlier data points, model generator 116 may introduce an algorithm, such as a RANSAC algorithm, to fit only the best-fitted 90% data points of the curve iteratively.

Movies

A movie may be a special kind of show containing only one or two movies in the video library for the video delivery service. That is, a movie may be released once, and then there may be a sequel, but that is generally all the times the movies are released. Ad system 110 may be unable to predict the future movies from the show models that are based on stable statistics of many episodes of a show. However, ad system 110 can make a rough prediction based on global statistics. Ad system 110 can use a virtual show that aggregates all movies, shows, and videos. Ad system 110 may predict the available day range and video views of future released movies by sampling and duplicating historical video records from movies for a certain time period, such as the past two years. Ad system 110 may then adjust the window to the current prediction window. The sample rate and video views are determined according to the global statistics. The parameters (first day used, decaying speech, and available window) of the sample movies are filtered with a bi-monthly median filter to give a more stable and smooth prediction. Bi-monthly median filter removes spikes and zeros in the statistics so the predictions are smoother. This is because the view curves using the shows have spikes in them usually when episodes are released. The prediction of future movies is the same as new movies. Because the future identity (ID) of the future movie may not be known, all future shows are aggregated together and predicted in the same way as movie video prediction.

System Overview

Figure 9:
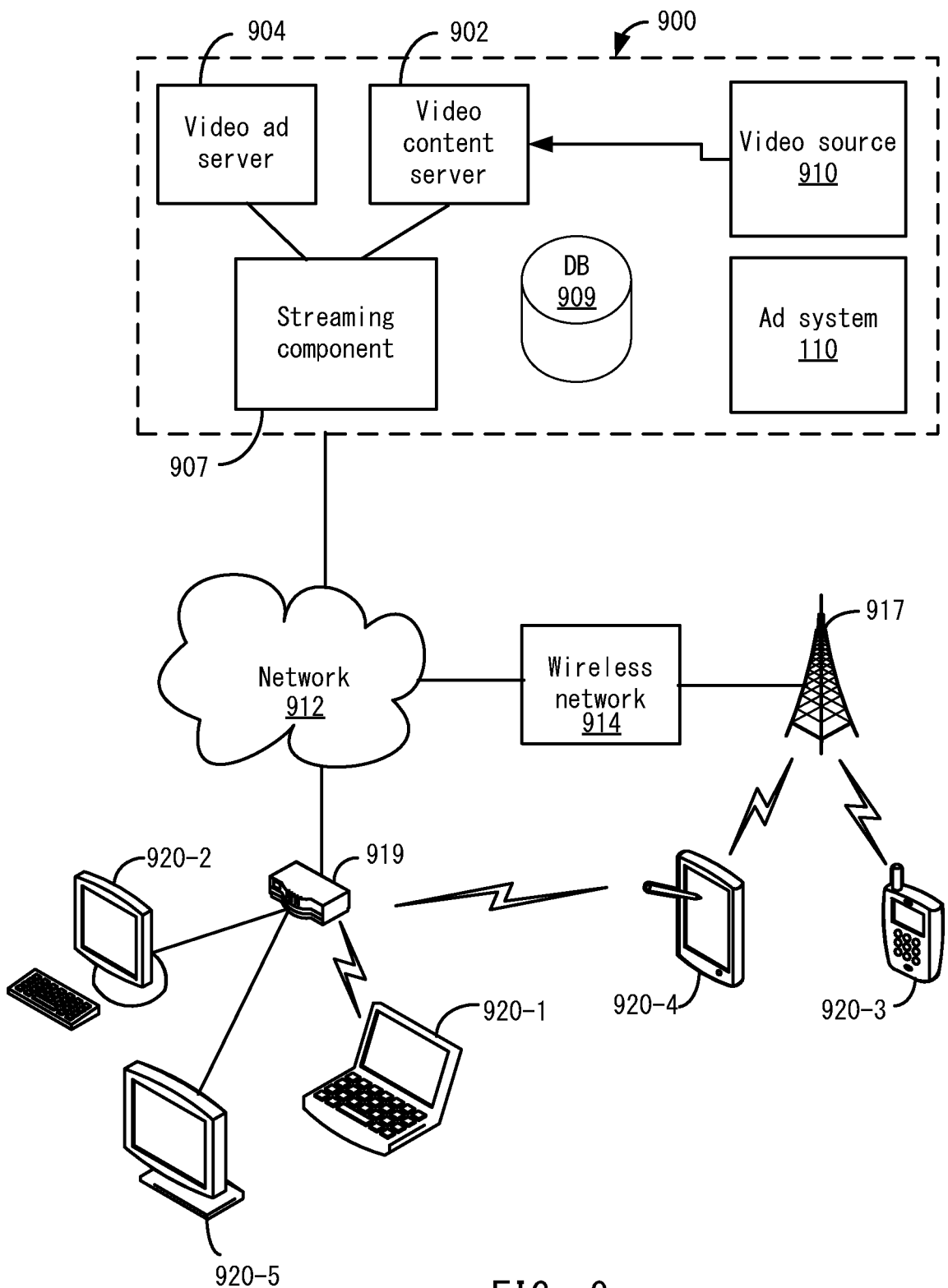
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. For example, the historical video views may be determined from the video streaming system. Aspects of the video streaming system 900 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 900, a public service message, or some other information. The video advertising server 904 may serve the video advertising segments as directed by a user interface controller (not shown).

The video streaming system 900 also may include ad system 110.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912 and/or other network 914. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless telephony network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
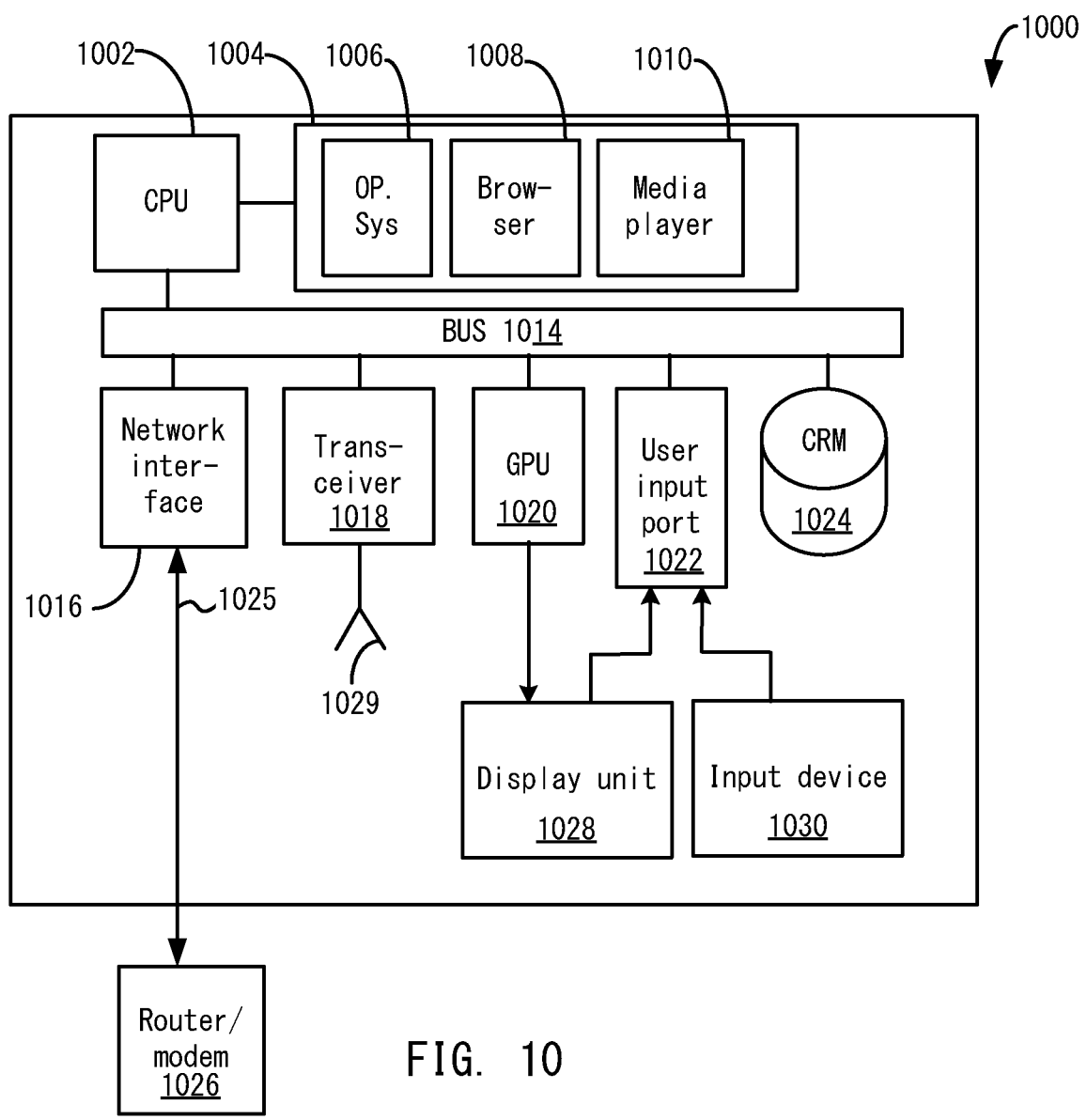
FIG. 10 depicts a diagrammatic view of an apparatus for viewing video content.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 1000 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    sending, by a computing device, videos to users that use a video delivery service, wherein at least a portion of the videos include shows that have episodes released sequentially that are requested on demand when released;
    recording, by the computing device, historical records of video views for the video based on the sending of the at least a portion of the videos to the users that were requested on demand;
    for a show, determining, by the computing device, a show-specific model to predict future video views by performing:
    determining, by the computing device, historical records of video views for different episodes of the show that were requested on demand;
    training, by the computing device, the show-specific model with the historical records, wherein the show-specific model models a decay curve with a slow growing term that regularizes a decay speed of a decay of the decay curve;
    using, by the computing device, the show-specific model to predict future video views for requesting the show on demand for a future time range for episodes of the show, wherein using the show-specific model comprises:
        predicting, by the computing device, future video views for existing episodes of the show by setting a first day of the show-specific model to a first day in the future time range;
        predicting, by the computing device, future release dates of future episodes of the show; and
        predicting, by the computing device, future video views in the future time range for future episodes of the show by aligning a first day of the show-specific model to the respective future release dates of the future episodes; and
    outputting, by the computing device, the future video views to an ad system configured to sell ads for the show.

2. The method of claim 1, wherein the show-specific model comprises a log linear model for the decay curve with the slow growing term.

3. The method of claim 1, wherein the slow growing term follows a normal distribution.

4. The method of claim 3, wherein the normal distribution is substantially near −1 with a variance of σ.

5. The method of claim 1, wherein predicting future release dates of future episodes of the show comprises:
    generating a seasonal first day views model that models first day views for different episodes in a season for the show.

6. The method of claim 5, wherein the seasonal first day views model changes the first day views based on different factors for the show over time.

7. The method of claim 5, wherein predicting future video views comprises:
    using the first day views model to determine future video views for a future episode.

8. The method of claim 1, wherein predicting future release dates of future episodes of the show comprises:
    generating a seasonal week release and weekday model that models weekly releases of episodes of the show and weekday releases of episodes.

9. The method of claim 8, wherein predicting future video views comprises:
    using the seasonal week release and weekday model to determine future video views for a future episode in a week and on a day of the week determined by the seasonal week release and weekday model.

10. The method of claim 8, wherein predicting future video views comprises:
    estimating a hiatus for the show in which episodes for the show are not released.

11. The method of claim 1, further comprising:
    reviewing the historical records to determine any points that are considered outliers by a threshold; and
    removing the outlier points from the historical records.

12. The method of claim 1, wherein generating the show-specific model comprises:
    analyzing the historical records of a latest N number of episodes for the show to determine the show-specific model.

13. The method of claim 1, wherein generating the show-specific model comprises:
    aggregating the historical records of other movie and shows into a virtual show to determine the show-specific model.

14. The method of claim 1, wherein the show-specific model is a long-form show-specific model, the method further comprising:
    determining a short-form show specific model for a shorter form of the video than that used for the long-form show-specific model; and
    using the long-form show-specific model and the short-form show-specific model to estimate the video views for the shorter form of the video.

15. A non-transitory computer-readable storage medium containing instructions, that when executed, control a computer system to be configured for:

sending videos to users that use a video delivery service, wherein at least a portion of the videos include shows that have episodes released sequentially that are requested on demand when released;

recording historical records of video views for the video based on the sending of the at least a portion of the videos to the users that were requested on demand;

for a show, determining a show-specific model to predict future video views by performing:

determining historical records of video views for different episodes of the show that were requested on demand;

training the show-specific model with the historical records, wherein the show-specific model models a decay curve with a slow growing term that regularizes a decay speed of a decay of the decay curve;

using the show-specific model to predict future video views for requesting the show on demand for a future time range for episodes of the show, wherein using the show-specific model comprises:

predicting future video views for existing episodes of the show by setting a first day of the show-specific model to a first day in the future time range;

predicting future release dates of future episodes of the show; and predicting future video views in the future time range for future episodes of the show by aligning a first day of the show-specific model to the respective future release dates of the future episodes; and outputting the future video views to an ad system configured to sell ads for the show.

16. The non-transitory computer-readable storage medium of claim 15, wherein the show-specific model comprises a log linear model for the decay curve with the slow growing term.

17. The non-transitory computer-readable storage medium of claim 15, wherein the slow growing term follows a normal distribution substantially near −1 with a variance of σ.

18. An apparatus comprising:
one or more computer processors; and
a non-transitory computer-readable storage medium comprising instructions, that when executed, control the one or more computer processors to be configured for:

sending videos to users that use a video delivery service, wherein at least a portion of the videos include shows that have episodes released sequentially that are requested on demand when released;

recording historical records of video views for the video based on the sending of the at least a portion of the videos to the users that were requested on demand;

for a show, determining a show-specific model to predict future video views by performing:

determining historical records of video views for different episodes of the show that were requested on demand;

training the show-specific model with the historical records, wherein the show-specific model models a decay curve with a slow growing term that regularizes a decay speed of a decay of the decay curve;

using the show-specific model to predict future video views for requesting the show on demand for a future time range for episodes of the show, wherein using the show-specific model comprises:

predicting future video views for existing episodes of the show by setting a first day of the show-specific model to a first day in the future time range;

predicting future release dates of future episodes of the show; and predicting future video views in the future time range for future episodes of the show by aligning a first day of the show-specific model to the respective future release dates of the future episodes; and outputting the future video views to an ad system configured to sell ads for the show.

19. The non-transitory computer-readable storage medium of claim 15, wherein the slow growing term follows a normal distribution.

20. The non-transitory computer-readable storage medium of claim 15, wherein the show-specific model is a long-form show-specific model, further configured for:

determining a short-form show specific model for a shorter form of the video than that used for the long-form show-specific model; and using the long-form show-specific model and the short-form show-specific model to estimate the video views for the shorter form of the video.

* * * * *